(12) United States Patent
Barnes, Jr.

(10) Patent No.: US 12,011,024 B2
(45) Date of Patent: *Jun. 18, 2024

(54) ENROBER FOR VISCOUS AND/OR STICKY FOOD PRODUCTS

(71) Applicant: Cloyd Barnes, Jr., Peru, IL (US)

(72) Inventor: Cloyd Barnes, Jr., Peru, IL (US)

(*) Notice: Subject to any disclaimer, the term of this patent is extended or adjusted under 35 U.S.C. 154(b) by 0 days.

This patent is subject to a terminal disclaimer.

(21) Appl. No.: 18/117,849

(22) Filed: Mar. 6, 2023

(65) Prior Publication Data
US 2023/0200427 A1 Jun. 29, 2023

Related U.S. Application Data

(63) Continuation of application No. 17/118,486, filed on Dec. 10, 2020, now Pat. No. 11,617,387.

(60) Provisional application No. 62/974,440, filed on Dec. 10, 2019.

(51) Int. Cl.
| | |
|---|---|
| *A23P 20/17* | (2016.01) |
| *A23P 10/10* | (2016.01) |
| *B05C 3/10* | (2006.01) |
| *B05C 9/12* | (2006.01) |

(52) U.S. Cl.
CPC .............. *A23P 20/17* (2016.08); *A23P 10/10* (2016.08); *B05C 3/10* (2013.01); *B05C 9/12* (2013.01)

(58) Field of Classification Search
CPC . A23P 20/17; A23P 10/10; B05C 3/10; B05C 9/12
USPC .................................................. 118/30, 423
See application file for complete search history.

(56) References Cited

U.S. PATENT DOCUMENTS

| | | | | | |
|---|---|---|---|---|---|
| 2,056,845 | A | * | 10/1936 | Ferry | A47J 37/1214 99/405 |
| 2,085,494 | A | * | 6/1937 | Ferry | A47J 37/1214 99/405 |
| 2,853,937 | A | * | 9/1958 | Peck | A47J 37/1214 99/407 |
| 2,886,439 | A | * | 5/1959 | Eytinge | A47J 37/1214 99/407 |
| 3,959,498 | A | * | 5/1976 | Lyall | A23G 3/26 426/93 |
| 4,801,467 | A | * | 1/1989 | Groff | A47J 37/1214 426/438 |
| 5,085,137 | A | * | 2/1992 | Mottur | A23L 5/11 99/330 |
| 5,193,442 | A | * | 3/1993 | Moscowitz | A47J 37/1214 366/173.1 |
| 11,617,387 | B1 | * | 4/2023 | Barnes, Jr. | A23P 20/17 426/302 |
| 2004/0067282 | A1 | * | 4/2004 | Karwowski | A23L 25/25 426/94 |
| 2006/0099308 | A1 | * | 5/2006 | Zuehlke | G06F 16/173 426/293 |

(Continued)

FOREIGN PATENT DOCUMENTS

| | | | |
|---|---|---|---|
| JP | 2010154863 | * | 7/2010 |
| WO | WO2006028450 | * | 3/2006 |

*Primary Examiner* — Binu Thomas
(74) *Attorney, Agent, or Firm* — DLA PIPER LLP (US)

(57) ABSTRACT

A coating machine and method coat a viscous sticky coating onto a plurality of food products. The coating machine may used mechanical or ultrasonic mechanisms to remove the excess viscous sticky coating. The coating machine may also coat an outer surface of the viscous sticky coating.

11 Claims, 13 Drawing Sheets

(56) References Cited

U.S. PATENT DOCUMENTS

2012/0006261 A1* 1/2012 Nishihara ................. B05C 3/10
118/426
2016/0297623 A1* 10/2016 Covizzi ............. B65G 49/0463

* cited by examiner

ENROBER FOR VISCOUS AND/OR STICKY FOOD PRODUCTS

PRIORITY CLAIMS/RELATED APPLICATIONS

This application is a continuation of and claims the benefit of priority under 35 USC 120 and 121 to U.S. patent application Ser. No. 17/118,486, filed Dec. 10, 2020, now U.S. Pat. No. 11,617,387 issued on Apr. 4, 2023, that in turn claims the benefit of and priority under 119(e) and 120 to U.S. Provisional Application Ser. No. 62/974,440, filed Dec. 10, 2019, and entitled "Coating System and Method", the entirety of which is incorporated herein by reference.

FIELD

The disclosure relates to a device and method for coating a surface of an object and in particular to preparing a food product by coating the food product with a viscous and sticky coating on an outside surface of the food product.

BACKGROUND

Enrobing machines exists that can coat an outer surface of a food item with a coating. These machines transport the food item through a reservoir of the coating and under a waterfall style applicator and then removes the excess coating. These enrobing machines may either push the food item through a tank with the coating material, impale each food items and run, typically on a belt, the food item past a coating station or move the food items past a sprayer that coats the outer surface of the food item. These existing enrobing machines work quite well for a coating that is not too thick or sticky. If the coating is too thick and/or sticky, these enrobing machines often jam due to the thick and/or sticky coating and then have to be completely cleaned before restarting the enrobing process.

Other times, the thick or sticky coating starts to harden which again causes a jam in the enrobing machine. Thus, it is desirable to provide a coating machine that can coat viscous or sticky coatings onto food items and it is to this end that the disclosure is directed.

DETAILED DESCRIPTION OF ONE OR MORE EMBODIMENTS

The disclosure is particularly applicable to a coating machine that may be used to coat a plurality of food products, such as protein bites, with a rice based syrup that is viscous and sticky and then stick one or more different outer coatings, such as different nuts, to the coated food product and it is in this context that the disclosure will be described. It will be appreciated, however, that the coating machine and method has greater utility since the coating machine can be used to coat any viscous coating or any sticky coating onto any food product and may or may not also stick an outer coating to the coated food product.

Figure 1:
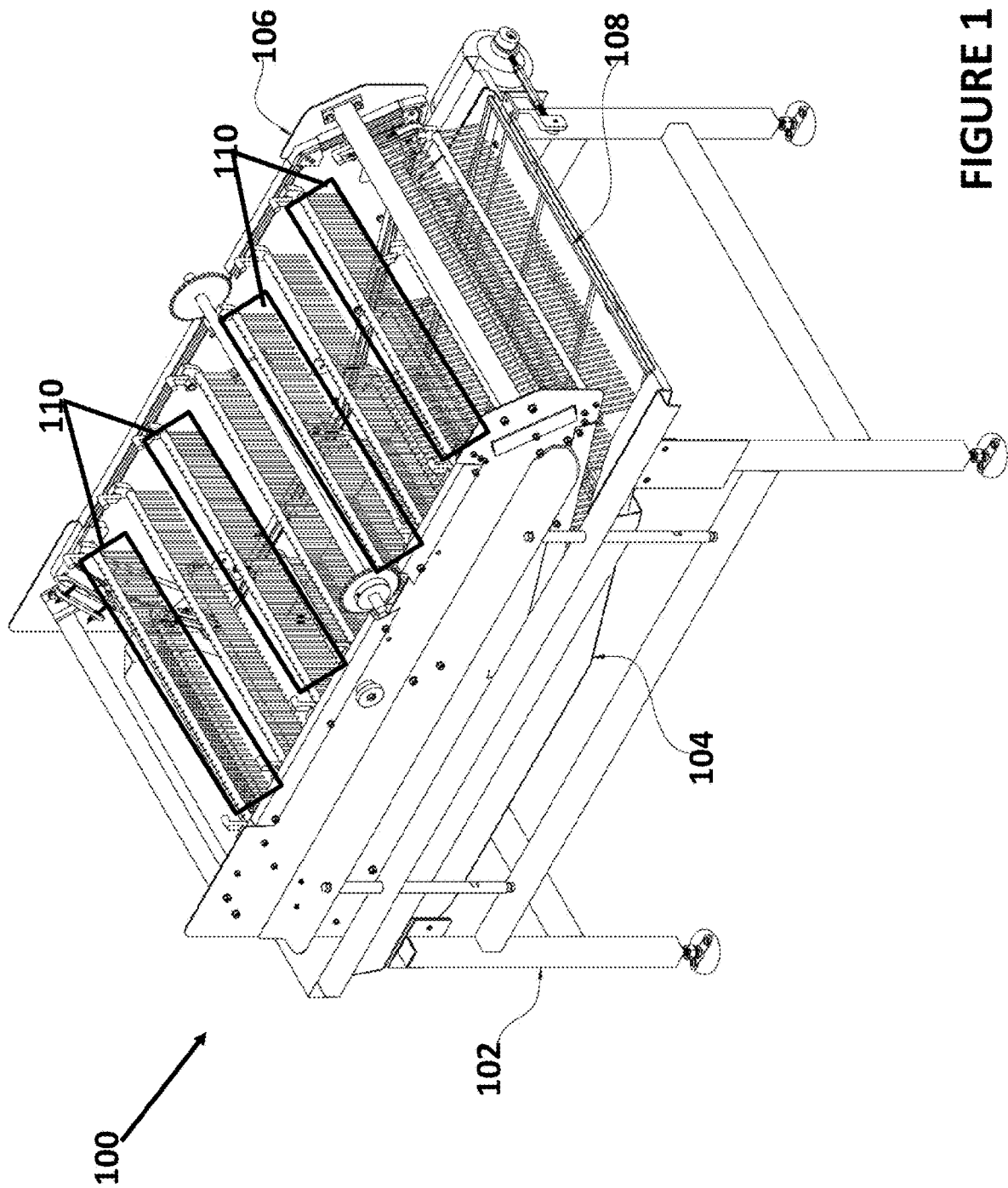
FIG. 1 shows a coater machine for applying a viscous coating to a food product.

FIG. 1 shows a coater machine 100 for applying a viscous coating to a food product. In one example, the food product may be a plurality of protein food bites and the viscous coating may be rice syrup that is coated onto the outer surface of the protein food bites in order to adhere outer food elements, such as different types of nuts, to the outer surface of the protein food bite. The machine 100 may also be used to coat any type of food product with any type of viscous or sticky or thick coating. The machine 100 may have a frame 102 that rests on a surface. The frame 102 may support a tank 104 that has an amount of coating material, such as viscous rice syrup, in it when it is being operated to coat the outer surface of the food item. The frame 102 also supports a head portion 106 that rests above the tank 104 (shown in more detail in FIG. 13 that is described below in more detail) and moves a food item, such as a plurality of individual food items, through the tank 104 to coat the outer surface of each food item with the coating material when the machine is operational. In an alternative embodiment, a height of the head portion 106 from the frame 102 may be adjustable. The machine 100 may be a pod that is moveable and can be moved into different parts of the process. Once the machine 100 is positioned at the appropriate position, the head portion 106 may be adjusted upwards so that the machine 100 couples to a drive mechanism (including a motor) that then moves the product flight carriers, etc. The machine 100 also has a stripper plate 108 that is connected to the frame 102 and forces excess coating material off of the outer surface of each food item.

The machine 100 can evenly coat the outer surface of uniform shaped and/or irregularly sized food product and load each of the food items into the machine 100 without lumping/clumping. The machine 100 is designed to maintain temperature for a given production rate by including a heater that maintains a predetermined temperature of the coating material. The machine 100, during unloading of each food item, may remove excess coating material from the outer surface of the each food item using the stripper plate 108. In one embodiment shown in the figures, the stripper plate 108 process is mechanical as shown in more detail in FIG. 11. Alternatively, the stripper plate 108 may include an ultrasonic device that uses ultrasonic sound energy to quickly and effectively remove the coating material from each food item for a uniform coating before the narrow range for temperature closes and the coating material sets up.

The head portion 106 of the machine 100 may further comprises a plurality of product flight carriers 110 that move using a chain drive (described below in more detail) to move the plurality of food items through the tank 104 to coat the outer surfaces of each food item. The machine 100 may have a motor (not shown) that causes the chain drive, etc. to move the plurality of food items through the tank 104.

Figure 2:
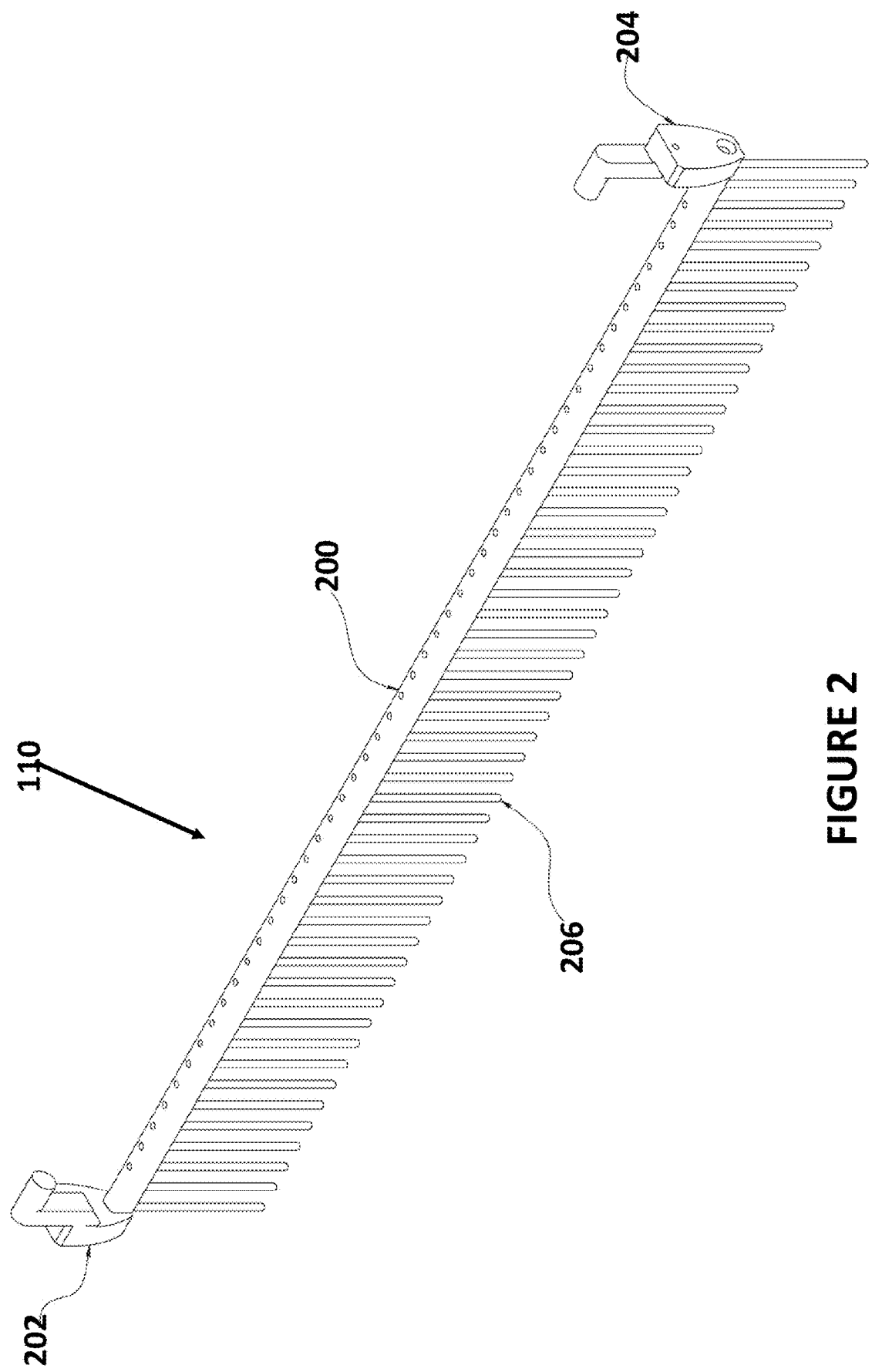
FIG. 2 illustrates one of a plurality of product flight carriers that may be part of the coater machine in FIG. 1.

FIG. 2 illustrates one of a plurality of product flight carriers 110 that may be part of the coater machine in FIG. 1. As shown in FIG. 2, each product flight carrier may have a base portion 200 that may be made of metal, such as aluminum, and may be round as shown in FIG. 2, although the base portion 200 may be made of other materials and may be of different shapes. Each longitudinal end of the base portion 200 (or at each opposite end of the base portion 200) may have a carrier dog 202, 204 that removable connects to a chain drive (discussed below) so that each individual product flight carrier 110 may be repaired, removed or replaced. For example, a product flight carrier 110 may become damages and need replacement or repair. As another example, to accommodate larger individual food items, one or more of the product flight carrier 110 may be removed from the machine. Each product flight carrier 110 may have a plurality of pins 206 that extend down from the base portion 200 and are spaced apart from each other. The product flight carriers 110 are designed to help evenly distribute all of the food items to pull each of the food items through the coating material in the tank. In one embodiment, the pins 206 are spaced wide enough apart to let the coating material flow through/around the pins but narrow enough to capture the food items and to make the food items tumble or roll that ensures even coating of the coating material and aid in the stripper plate process as described below. One skilled in the art would understand that the pitch of the pins (distance between the pins) may be changed or a different product flight carrier 110 may be used with a different pitch of the pins for a different sized food item.

Figure 3:
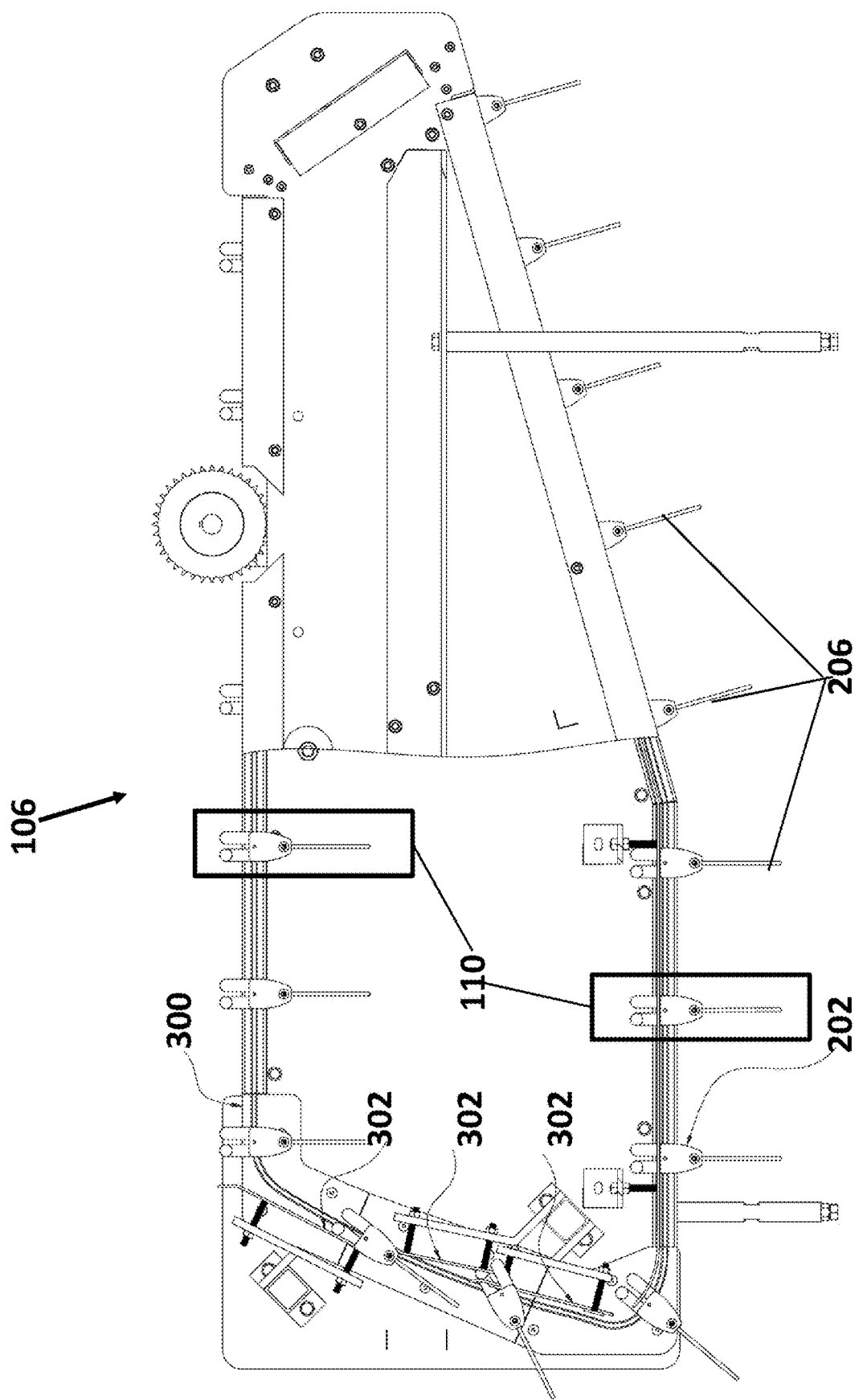
FIG. 3 illustrates more details of the coating machine in FIG. 1 and shows a spacing of the plurality of product flight carriers in one embodiment.

FIG. 3 illustrates more details of the coating machine in FIG. 1 and shows a spacing of the plurality of product flight carriers 110 in one embodiment in the head portion 106 of the machine. The spacing of the product flight carriers 110 are to accommodate different production rates but not make the machine too bulky. The spacing between the flights 110 are determined by the chain pin spacing on a chain track 300 that forms a loop around the head portion 106. The spacings allow the product flight carriers 110 to be move by the chain track 300 and prevent the product flight carriers 110 from binding up at each striker plate 302. The product flight carriers 110 are transported along the chain track 300 by the carrier dogs (shown in FIG. 2) located at each end and hang on the chain pin. Each striker plate 302 maneuvers each product flight carriers 110 at an input of the machine (on the left side of FIG. 3) to direct the pins 206 away from the machine to be able to pick up and move a plurality of pieces of food items through the tank of coating material (that is not shown in FIG. 3.) For example, each pin may have a 0.1875" diameter with spacing at 0.700" between each pin for an irregular shaped food ball of ¾" to 1" diameter. The size of each pin and the spacing between the pins can be adjusted for product requirements and testing for optimum balance. Furthermore, each pin may be a tapered pin or a triangular shaped pin. As another example, if the food item being coated was 1¼" to 1½" in diameter, each pin may be 0.250" to 0.3125" in diameter and the spacing between a pin and an adjacent pin may be 1⅛".

Figure 4:
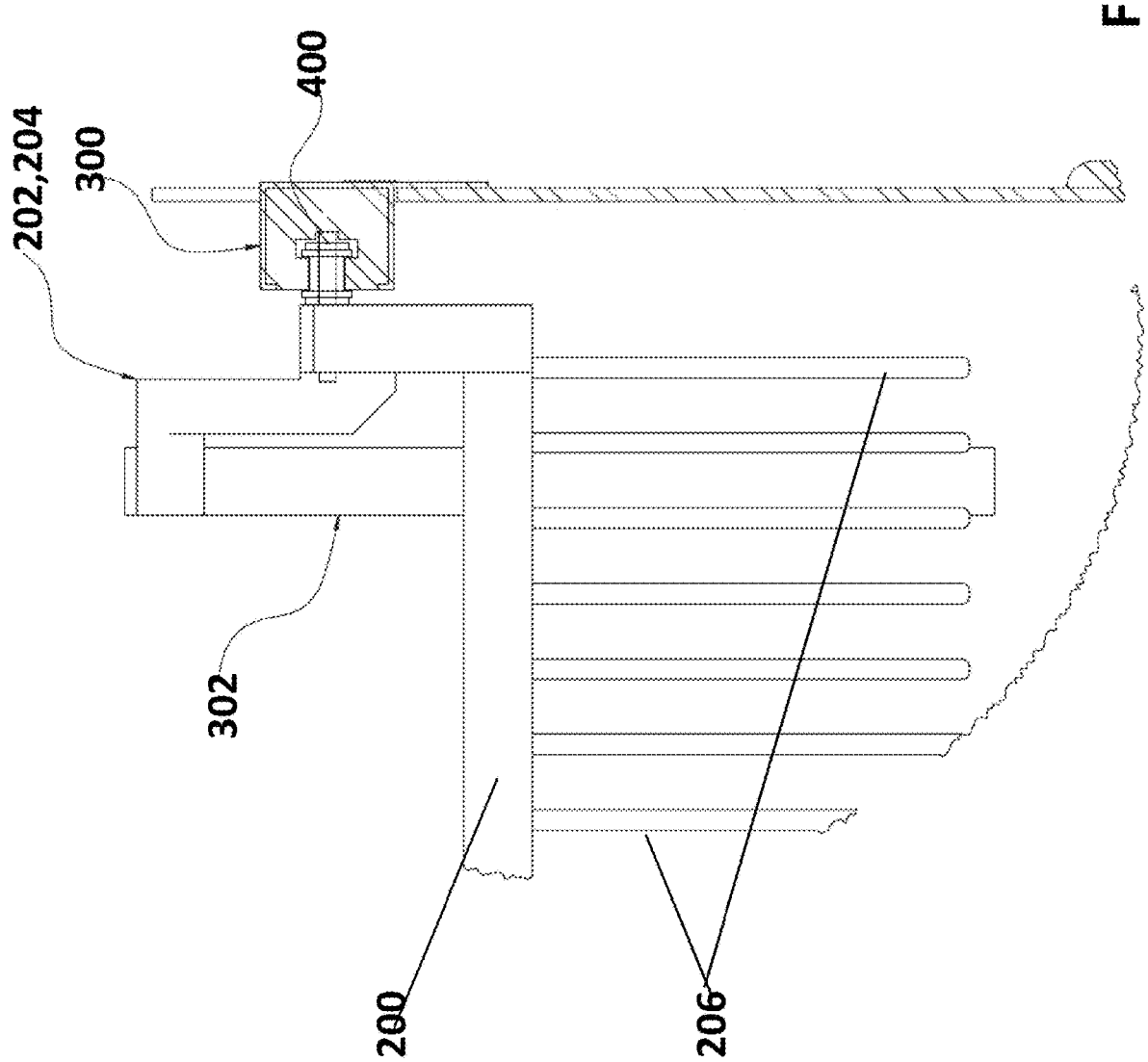
FIG. 4 illustrates more details of the carrier dogs that may be part of the coating machine in FIG. 1.

FIG. 4 illustrates more details of the carrier dogs 202, 204 that may be part of the coating machine in FIG. 1 with a partial cutaway view. The carrier dogs 202, 204 are designed for the simplicity of a simple mechanisms trigger point that works in conjunction with the chain track 300, striker plates 302 and dog carrier rails. Each carrier dog 202, 204 of each product flight carrier 110 (that each has the base portion 200) removable connects into a chain 400 that moves each product flight carrier 110 along the chain track 300. The machine 100 allows for a very sanitary design inside the machine 100. Specifically, the open design of the head portion 106, etc. of the machine 100 allows for easy access to wash the machine 100 with visual inspection. Furthermore, the pieces of the machine 100 incorporate no seams for hidden debris. In addition, because of head portion 106 is removable, the machine 100 may include a simple lifting device on caster wheels to make the machine 100 moveable and the parts of the machine 100 can be easily broken down if required by individual production facility's sanitation procedures.

Figure 5:
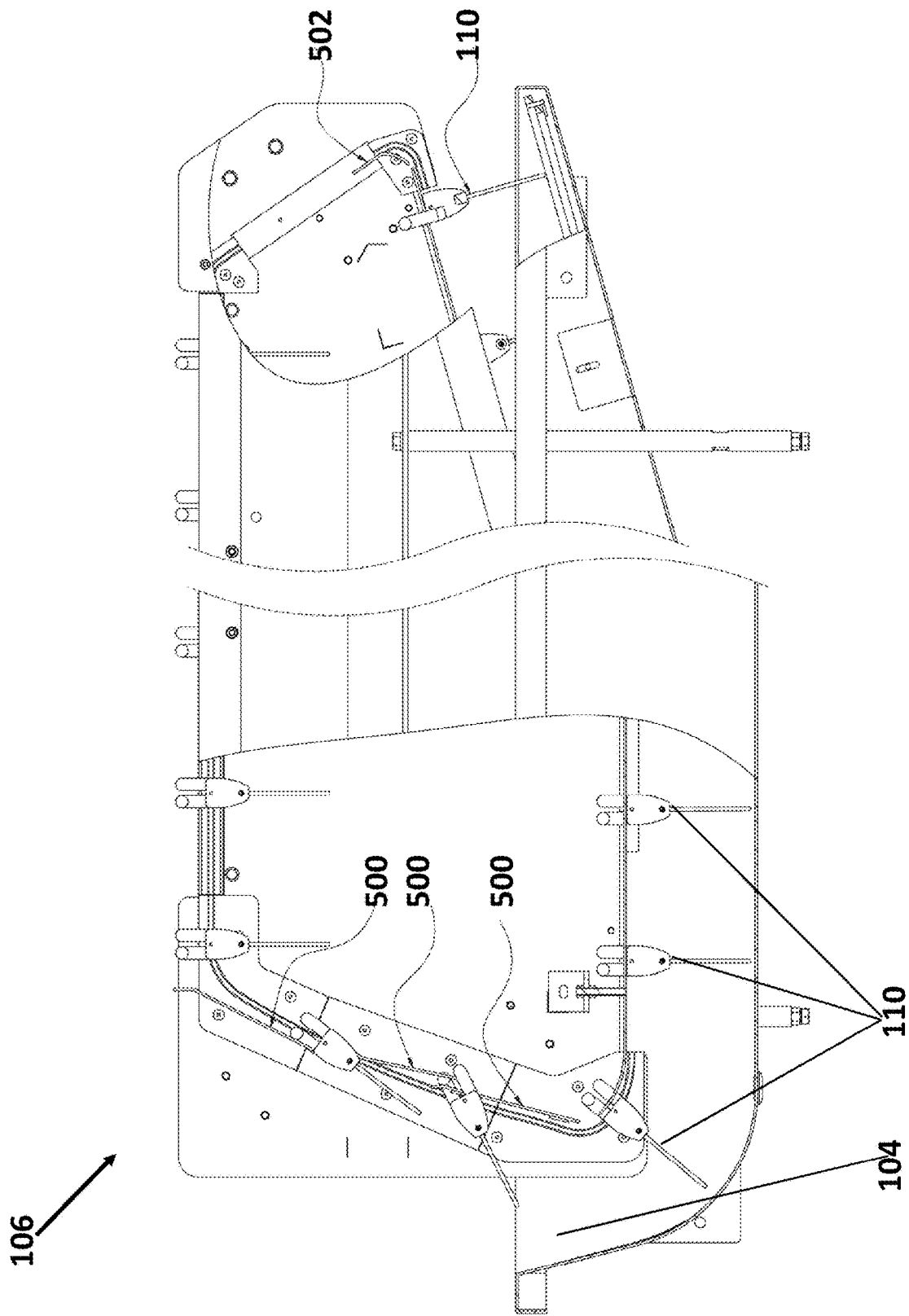
FIG. 5 illustrates more details of the placement of the plurality of striker plates that may be part of the coating machine in FIG. 1.

FIG. 5 illustrates more details of the placement of the plurality of striker plates that may be part of the coating machine in FIG. 1 and the head portion 106 of the machine (and a cutaway view of the tank 104). As illustrated and described above, the head portion has the plurality of product flight carriers 110 on a chain track that move around the machine and through the tank 104 to move/roll/tumble the food items to coat them with the coating material that is in the tank 104. The plurality of product flight carriers 110 interact with strike plates in different ways along the chain track. In particular, the head portion 106 may have one or more infeed striker plates 500 at the input side of the machine at which the uncoated food items are loaded into the machine. The one or more infeed striker plates 500 direct the product flight carriers 110 to pick up the food items. The head portion may also have one or more discharge striker plates 502 at an output end of the machine from which the coated food items exist the tank and the coating material and may be fed into one or more different modules for coating another food product, such as various types of nuts, etc., onto each food item that adhere to the sticky coating material. The one or more discharge striker plates 502 ensure quick food items removal from each product flight carrier 110 to eliminate the transfer of the coating material outside of the machine. As described above, the one or more discharge striker plates 502 may mechanically remove the coating material from the each product flight carrier 110 or may use ultrasonics to remove the coating material from the each product flight carrier 110. In the mechanical embodiment, the striker plate 502 may have scrappers or brushes and can also be designed with a pan for the pins to pass thru and can have hot water. In the ultrasonics embodiment, sound waves are used to displace the coating material from the pins. Various ultrasonic mechanisms may be used so that, for example, a Dukane ultrasonics commercially available system may be used.

Figure 6:
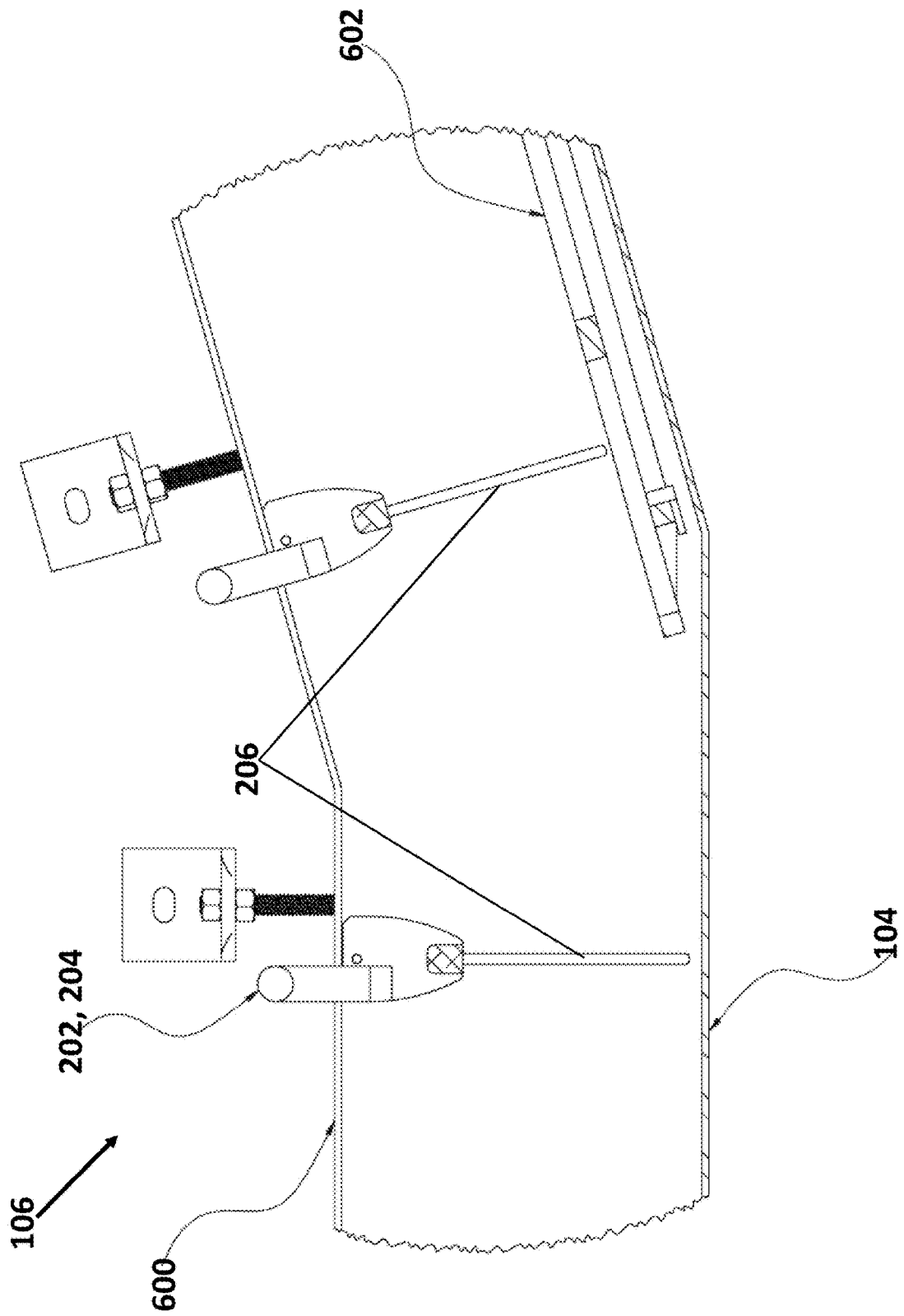
FIG. 6 illustrates more details of each product carrier rail that may be part of the coating machine in FIG. 1.

FIG. 6 illustrates a cutaway portion that shows more details of each product carrier rail that may be part of the coating machine in FIG. 1. In particular, a product carrier rail or rails 600 may be part of the chain track 300 described above and the product carrier rails 600 provide support to the carrier dogs 202, 204 to keep the attached product flight carriers 110 perpendicular to the tank for product transport while the food items are in the tank 104 being coated. A stripper plate 602 is parallel to an output portion of the tank 104 and strip the excess coating material from each food items and the pins 206. As shown in FIG. 6, each pin 206 may have a predetermined gap between the bottom of the pin and the bottom of the tank, that may be adjusted to maximize product movement that keeps the food items moving towards the discharge in the tank 104 and prevents a food item from remaining in the tank. Then, the gap is ⅛" (but may be adjusted) when the pin is adjacent the stripper plate 602. Depending on the particular food item being coated, the gap between the pin and bottom of the tank may be adjusted depending on the size of each food item.

Figure 7:
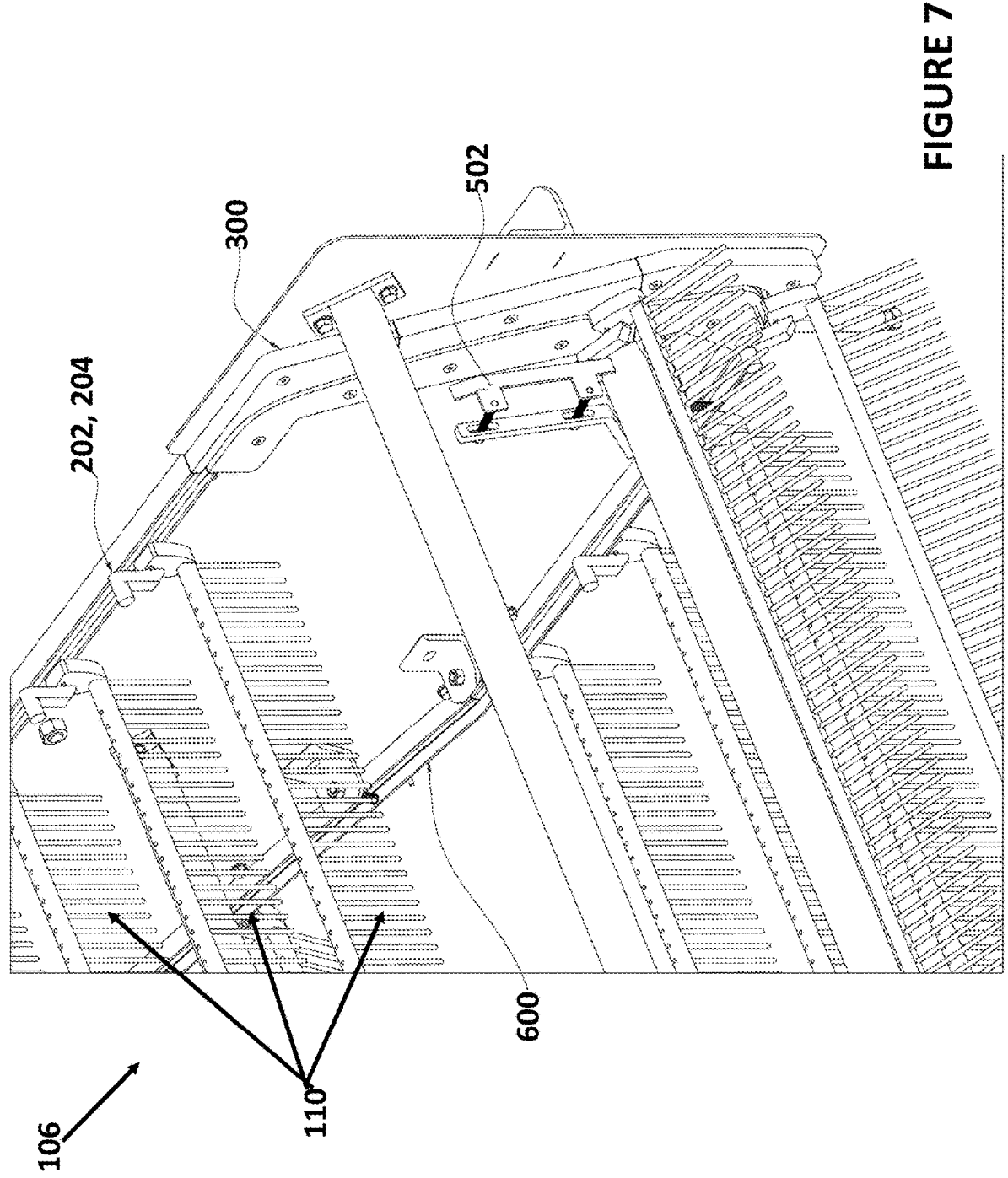
FIG. 7 illustrates more details of the chain track that may be part of the coating machine in FIG. 1.

FIG. 7 illustrates more details of the chain track 300 that may be part of the coating machine in FIG. 1. The chain track 300 (and its product carrier rails 600) are designed to assist in the movement of the product flight carriers 110 and the actuation of them with the carrier dogs 202,204 and the one or more discharge striker plate(s) 502.

Figure 8:
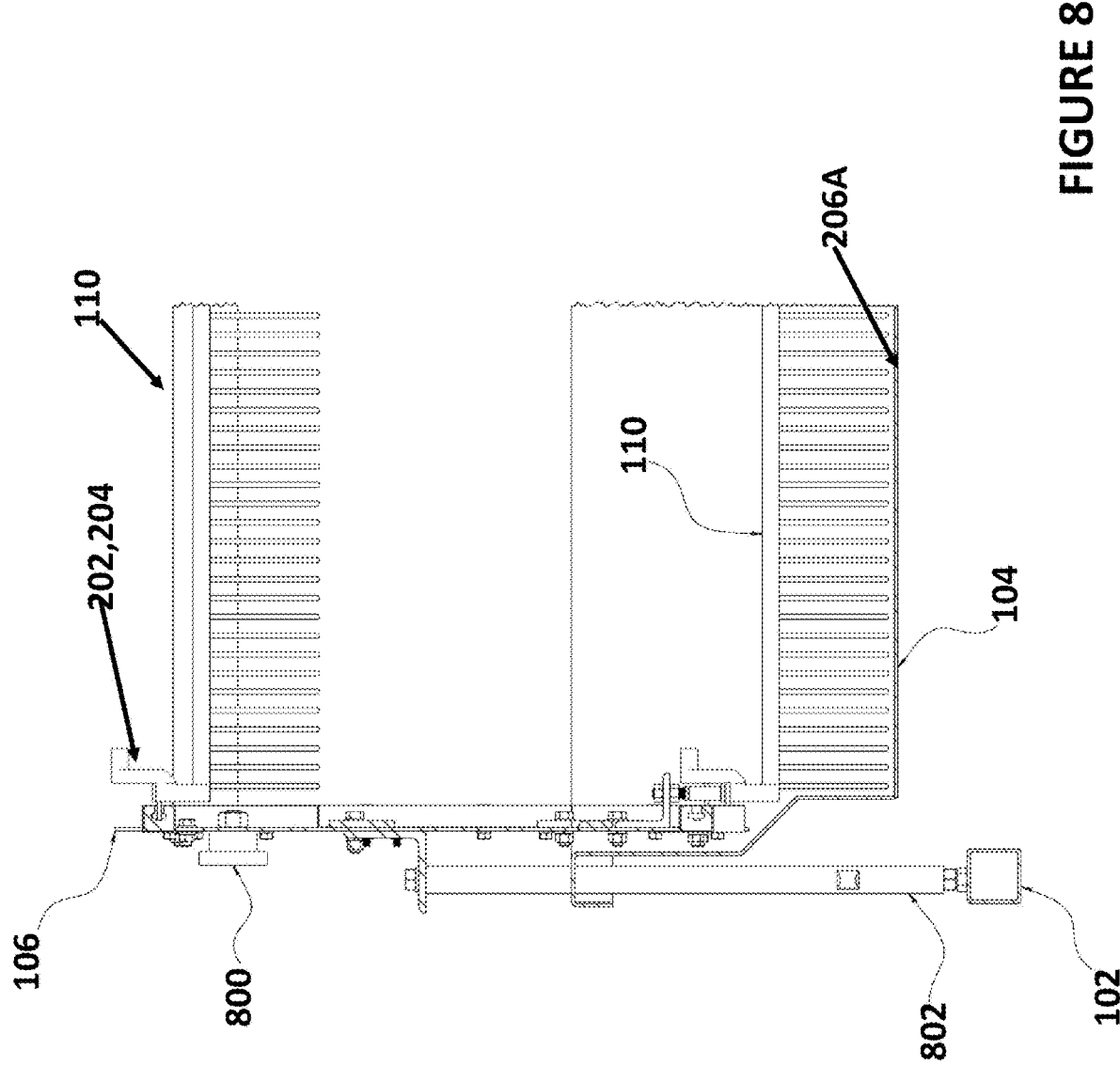
FIG. 8 illustrates more details of a head portion that may be part of the coating machine in FIG. 1.

FIG. 8 is a cutaway side view of and illustrates more details of a head portion 106 that may be part of the coating machine in FIG. 1. The head 106 is designed to be adjustable for spacing between a bottom of the pins 206A and the inside tank 104 bottom to accommodate different food item/product sizes and aid in the transportation of the product. The spacing may be adjusted by the adjustable head leg 802 whose length is adjustable and then securely to the frame 102 and the head portion 106. The weight of the head portion 106 holds it down and the specially formed tank 104 has holes (shown in detail in FIG. 13) that the legs pass thru and keeps it in position horizontally. As described above, the horizontal position of the head portion 106 may be adjusted to connect the machine 100 to the drive unit. The machine 100 is designed for easy and efficient sanitation so the head 106 is easily removable for maintenance and sanitation. A lifting lug 800 allows the head portion 104 to be removed from the machine 100 without having to touch the components of the machine that interact with the food items.

Figure 9:
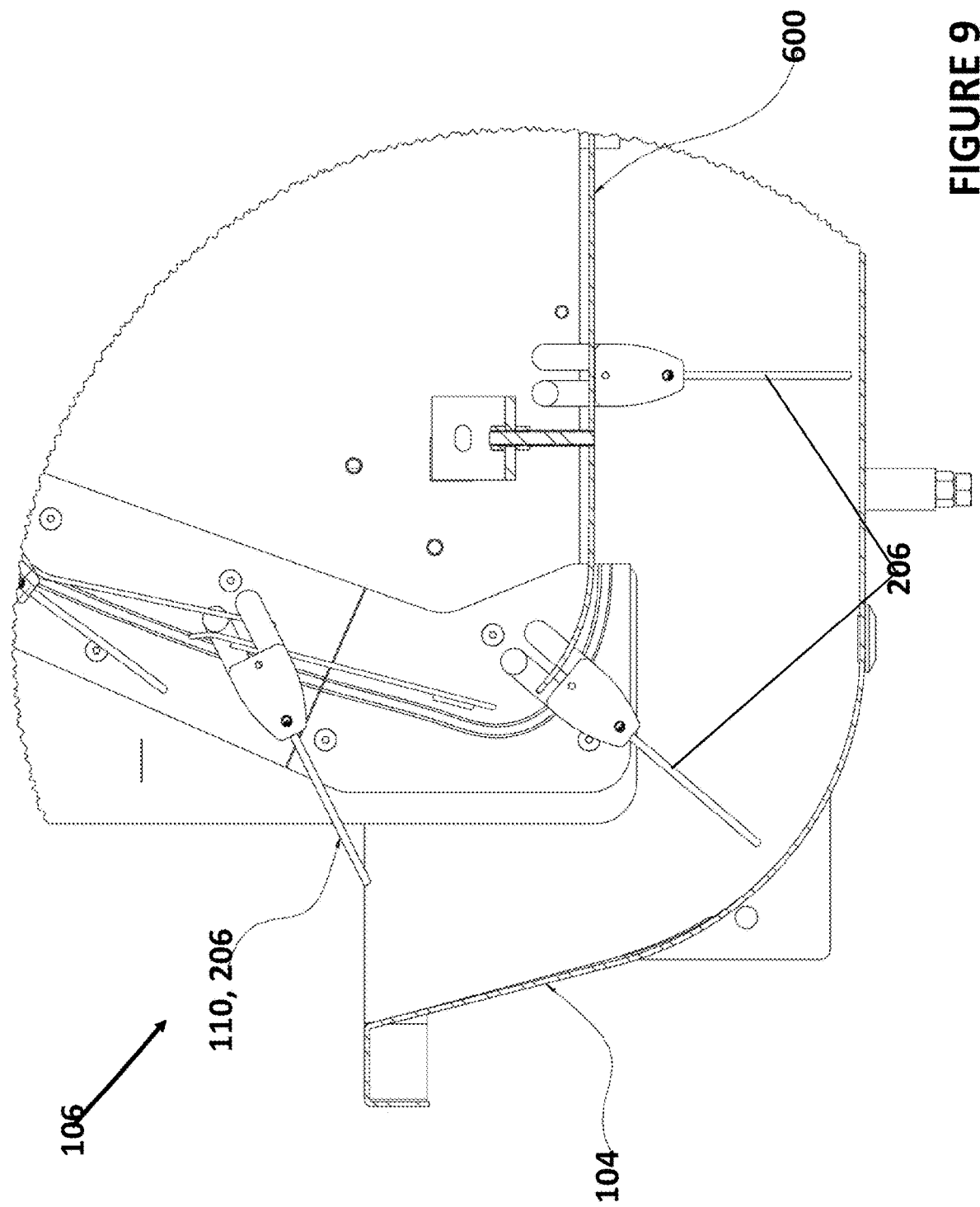
FIG. 9 illustrates more details of an infeed end of the tank that may be part of the coating machine in FIG. 1.

FIG. 9 illustrates more details of an infeed end of the tank that may be part of the coating machine in FIG. 1. The infeed end of the tank is designed to have a curve with a radius that allows the product fight carriers 110 (and pins 206) to easily load the food items/product for transportation (guided by the product carrier rails 600) thru the coating material in the tank 104. As shown in FIG. 9, each product carrier 110 and its pins 206 are a large distance away from the inner surface of the tank bottom 104 initially so that food items may be loaded into the machine, the pins 206 become closer at the middle part of the curved region and then are very close to the bottom of the tank after the curved region of the infeed end of the tank 104.

Figure 10:
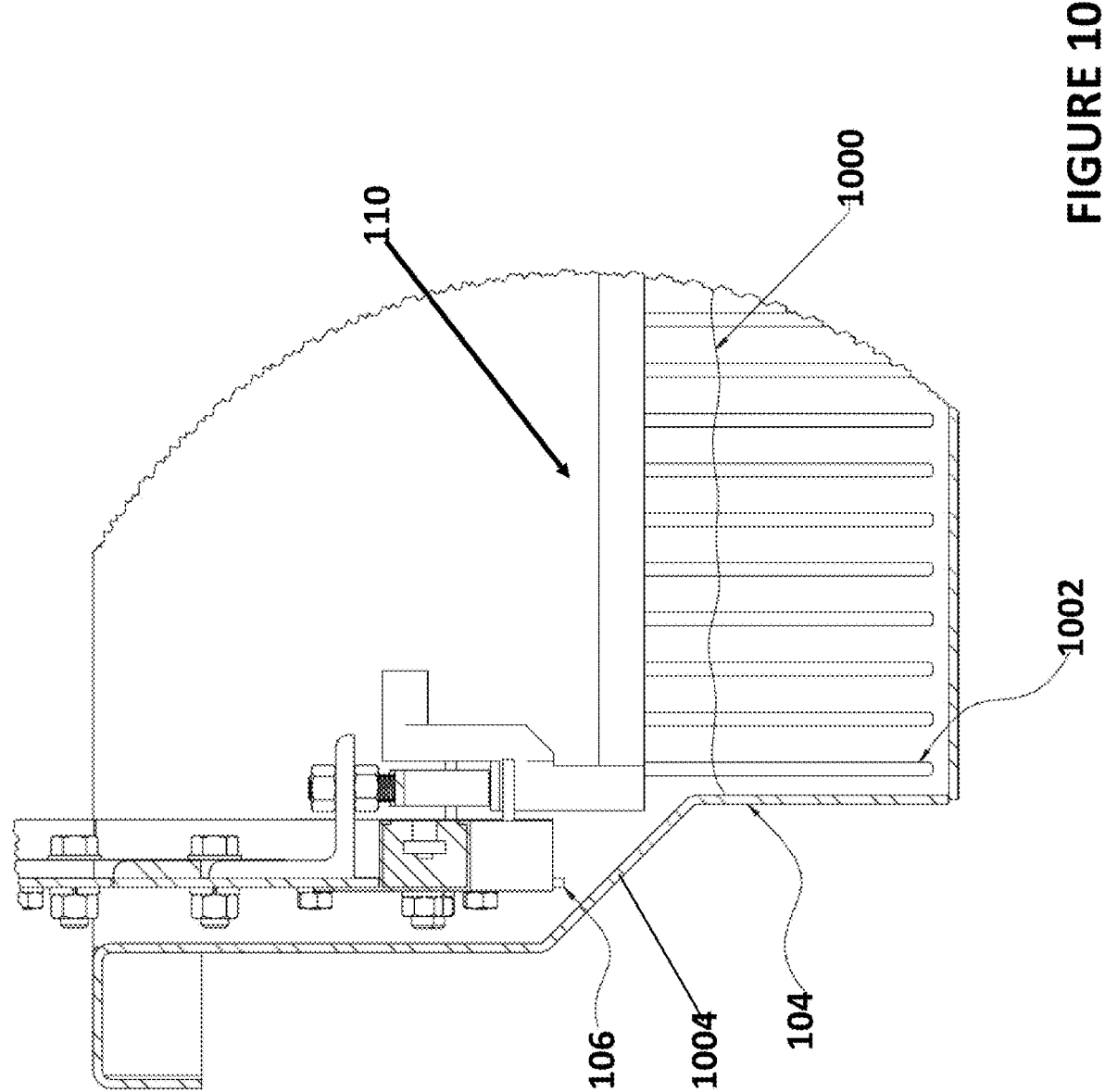
FIG. 10 illustrates the tank side walls of the coating machine in FIG. 1 that may be sloped.

FIG. 10 illustrates the tank 104 side walls of the coating machine in FIG. 1 that may be sloped to aid in narrowing the space between the flight carrier pin 1002 at the end of the product flight carrier 110 and the tank wall 104 while the product flight carrier 110 is in the tank 104 moving food items through the coating material in the tank 104 that is at a level 1000. The narrowing of the space between the flight carrier pin 1002 at the end of the product flight carrier 110 and the tank wall 104 prevents food items from resting in that space, escaping from the sides of the carrier 110 and not being moved through the coating material. As shown in FIG. 10, the tank 104 may have a sloped portion 1004 that is angled inwards towards the end product flight carrier pin 1002 wherein an upper portion of the tank 104 allows the chain 300, chain track 400 and the carrier dog 202, 204 to move within the tank 104 while minimizing the distance of the end pin 1002. This design allows the head 106 to be as close as possible without touching the coating material in the tank 104 and to aid in sanitation and cleaning of the material when needed since those components of the head 106 do not come into contact with the coating material.

In an alternative embodiment, the tank 104 may be shallower on its side and the pins 206 on the chain may be longer so that all of the chain track, striker plates and carrier rails could be moved out of the product zone and not get coated by the coating material during operation or to insure isolation of mechanical components and food product zones that may be determined by the individual food manufacturer.

Figure 11:
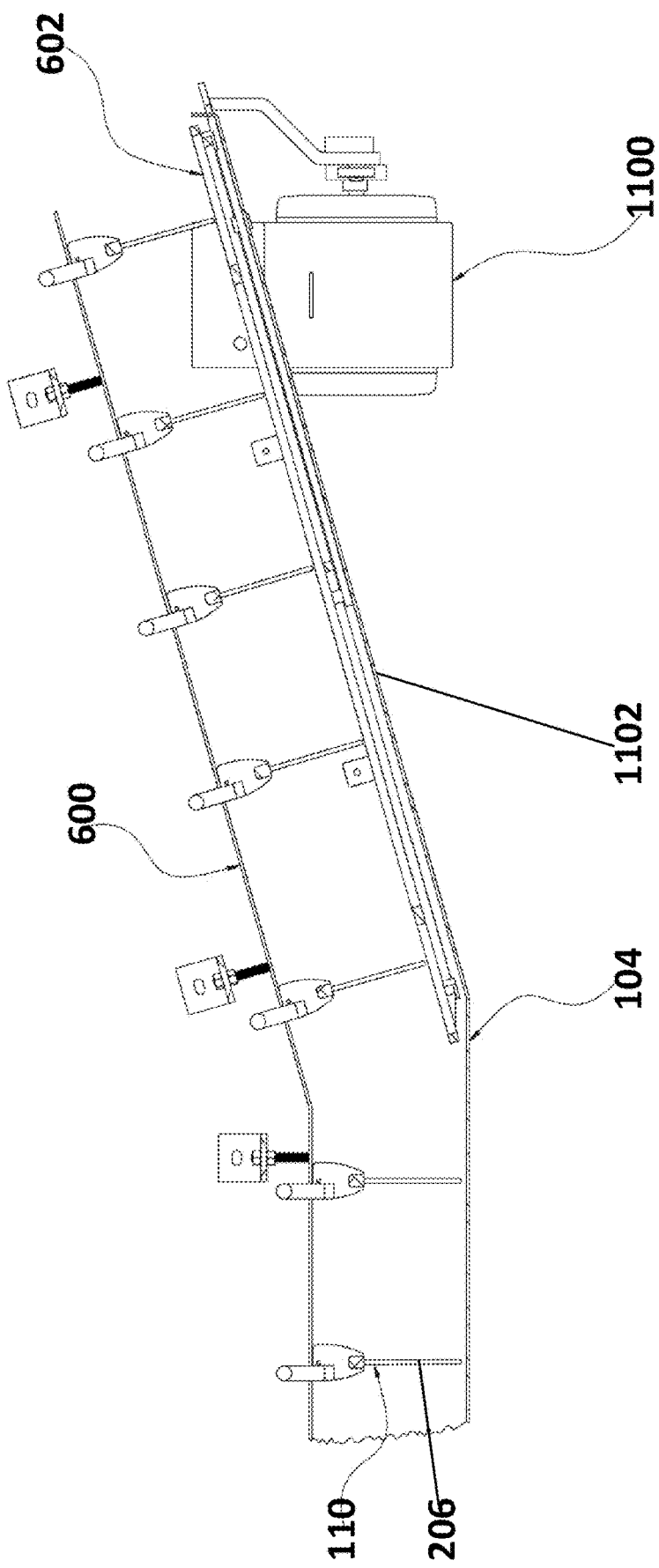
FIG. 11 illustrates more details of a stripper plate assembly that may be part of the coating machine in FIG. 1.

FIG. 11 illustrates more details of a stripper plate assembly 602 that may be part of the coating machine in FIG. 1. As shown in FIG. 11, the stripper plate assembly 602 may be mounted to an upwardly sloping portion 1102 of the tank 104 adjacent the discharge of the machine 100. The stripper plate assembly 602 may be mechanical (and have a motor 1100 that provides the energy) or ultrasonic and it may be used to remove any excess coating material from the food product items as they exist the discharge of the machine 100. The stripper plate 602 movement along with the product flight carriers 110 and pins 206 (along the product carrier rail 600) causes the food item product to tumble and roll to aid in the coating material removal as soon as the food item product exits the bath otherwise the coating material will set up too fast and be difficult to remove.

In one embodiment, the mechanical stripper may be a mesh style (expanded metal) grate (See FIG. 13 for example) mounted to the main stripper plate and the grating catches the food item, such as a ball, and with the force of the pins pushing each food item, the food item begins to roll and the syrup will stick to the grate on its way up and out. The ultrasonic embodiment produces an ultra hi pitch vibration that is adjustable and because of the hi vibration the syrup is quickly removed and the tumbling with the stripper plate ensures even coverage and removal.

The tank 104 may be heated and insulated so that the viscous coating material is at an optimal temperature for being coated onto the outer surfaces of the food product items. The heater may heat the viscous coating material to the optimal temperature and the insulator may maintain the heated viscous coating material at the optimal temperature and reduce the amount of energy to heat the viscous coating material to the optimal temperature. For example, the tank 104 may maintain the coating material at a temperature of between 170-200 degrees Fahrenheit.

The tank 104 may also have a drain at a bottom of the tank (not shown) to be able to drain the coating material and thus aid in sanitation and maintenance. Furthermore, the tank 104 and head 106 are easily separable so that the machine 100 is portable and the head 106 and tank 104 nest together for fast product change over with the quick insertion of another head and tank referenced as a "POD". Furthermore, a plurality of different modules may be placed at the discharge to adhere other food items, such as nuts or other food items, to the outer surface of the food item that is coated with the viscous coating material.

In some embodiments, at least the pins 206 and stripper plate may each be coated with Teflon or another non-sticking material so that the coating material does not stick onto the pins when the pins are not in the tank. In alternative embodiments, various other elements of the head 106 may be coated with Teflon or another non-sticking material so that the viscous coating material does not stick to these elements for easier cleaning.

Figure 12:
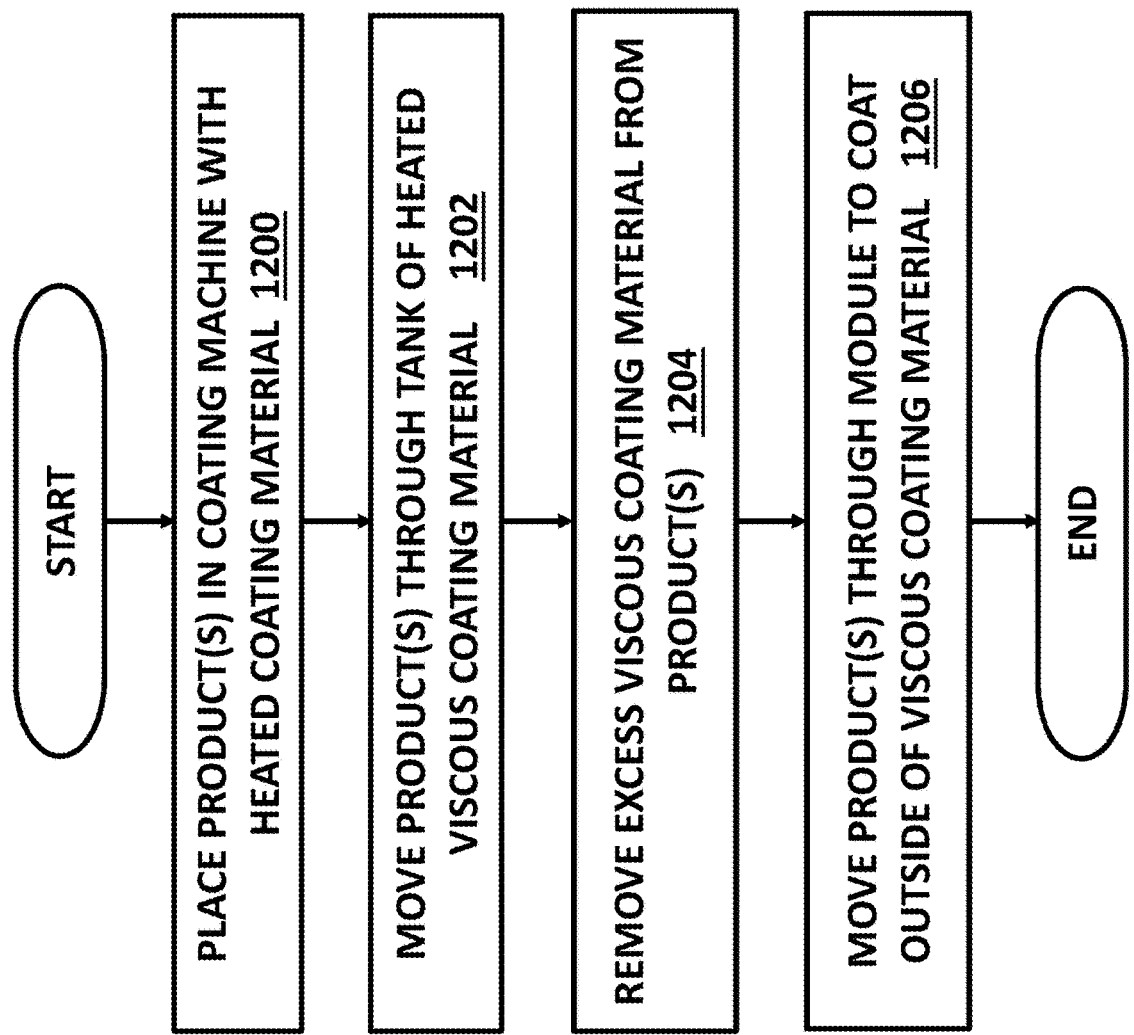
FIG. 12 illustrates a method for coating a food product with a viscous coating.

FIG. 12 illustrates a method 1200 for coating a food product with a viscous coating material. Once the machine is set up and the viscous coating material is in the tank and has been heater to the optimal process temperature, the product(s), such as food items, may be placed into the coating machine (1200). The plurality of products may be moved through the tank of heater viscous coating material (1202) using the product carriers and pins and the other elements of the machine. The machine ensures that each product is evenly coated as described above. At a discharge of the machine, excess viscous coating material is removed from each product (1204) such as by using the stripper described above. The method 1200 may include an optional process in which the outer surface of the coated products are coated with another food product that adheres to the viscous coating material (1206). In one embodiment, each product is a food bite and the other food product may be a type of nut that is adhered to the food bite.

Figure 13:
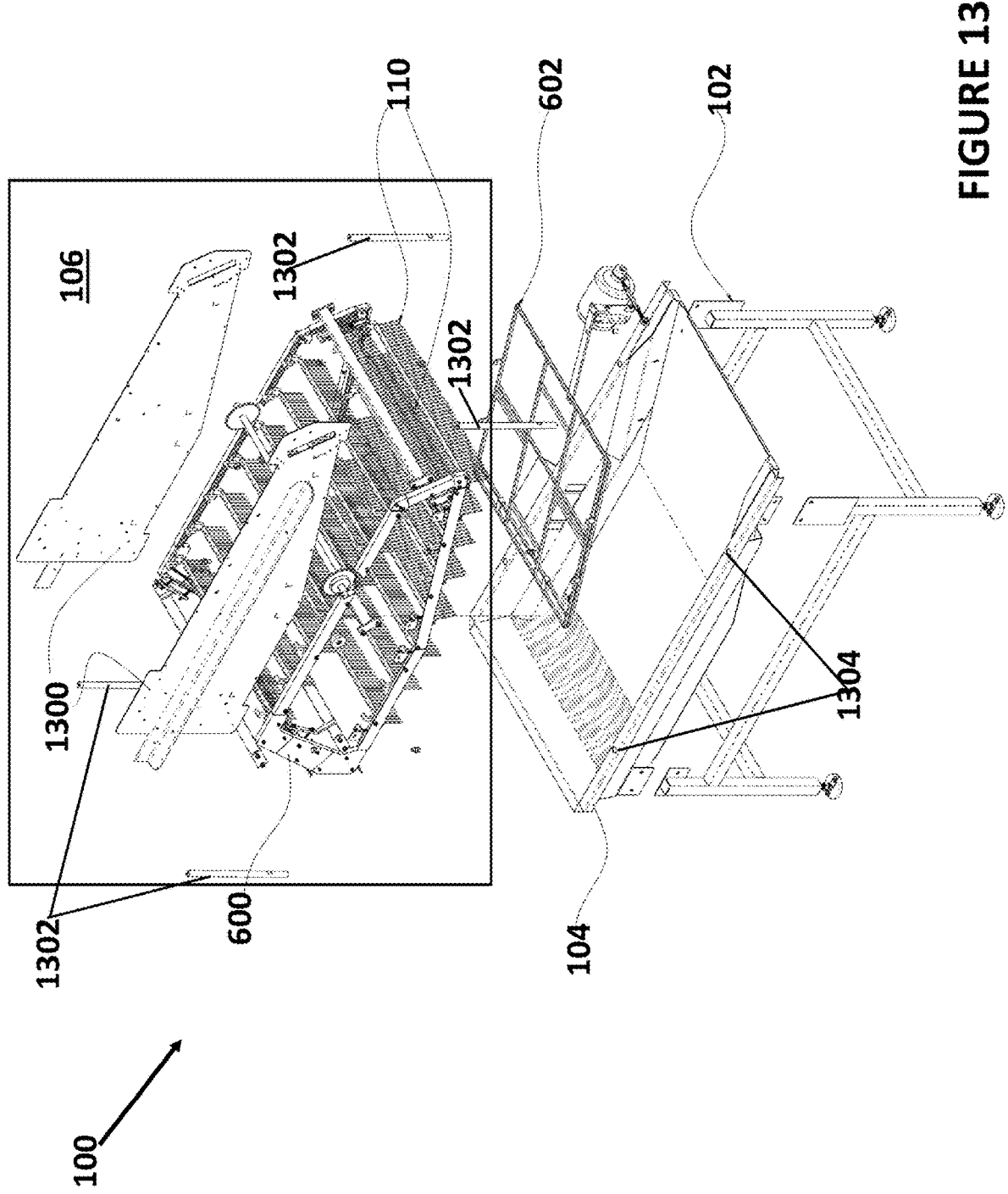
FIG. 13 illustrates an exploded assembly diagram of the coater machine.

FIG. 13 is an exploded assembly diagram of the coating machine 100 that shows the frame 102, tank 104 and head portions 106 as well as the product carrier rails 600 and the stripper plate 602 and the product flight carriers 110. FIG. 13 also shows that a right and left side of the head portion 106 has a side frame 1300 that is connected to the rest of the head portion 106 once assembled. FIG. 13 also shows a set of posts 1302 that are secured to the head portion 106 and pass through a set of holes 1304 in a side rail of the tank 104 and rest of a lower portion when the machine 100 is assembled to keep the tank 104 and the head portion properly aligned during the coating process. The posts 1302 and holes 1304 however, allow the head portion 106 to be easily removed from the tank 104 for easy cleaning and maintenance.

The foregoing description, for purpose of explanation, has been with reference to specific embodiments. However, the illustrative discussions above are not intended to be exhaustive or to limit the disclosure to the precise forms disclosed. Many modifications and variations are possible in view of the above teachings. The embodiments were chosen and described in order to best explain the principles of the disclosure and its practical applications, to thereby enable others skilled in the art to best utilize the disclosure and various embodiments with various modifications as are suited to the particular use contemplated.

The system and method disclosed herein may be implemented via one or more components, systems, servers, appliances, other subcomponents, or distributed between such elements. When implemented as a system, such systems may include and/or involve, inter alia, components such as software modules, general-purpose CPU, RAM, etc. found in general-purpose computers. In implementations where the innovations reside on a server, such a server may include or involve components such as CPU, RAM, etc., such as those found in general-purpose computers.

Additionally, the system and method herein may be achieved via implementations with disparate or entirely different software, hardware and/or firmware components, beyond that set forth above. With regard to such other components (e.g., software, processing components, etc.) and/or computer-readable media associated with or embodying the present inventions, for example, aspects of the innovations herein may be implemented consistent with numerous general purpose or special purpose computing systems or configurations. Various exemplary computing systems, environments, and/or configurations that may be suitable for use with the innovations herein may include, but are not limited to: software or other components within or embodied on personal computers, servers or server computing devices such as routing/connectivity components, handheld or laptop devices, multiprocessor systems, microprocessor-based systems, set top boxes, consumer electronic devices, network PCs, other existing computer platforms, distributed computing environments that include one or more of the above systems or devices, etc.

In some instances, aspects of the system and method may be achieved via or performed by logic and/or logic instructions including program modules, executed in association with such components or circuitry, for example. In general, program modules may include routines, programs, objects, components, data structures, etc. that perform particular tasks or implement particular instructions herein. The inventions may also be practiced in the context of distributed software, computer, or circuit settings where circuitry is connected via communication buses, circuitry or links. In distributed settings, control/instructions may occur from both local and remote computer storage media including memory storage devices.

The software, circuitry and components herein may also include and/or utilize one or more type of computer readable media. Computer readable media can be any available media that is resident on, associable with, or can be accessed by such circuits and/or computing components. By way of example, and not limitation, computer readable media may comprise computer storage media and communication media. Computer storage media includes volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic tape, magnetic disk storage or other magnetic storage devices, or any other medium which can be used to store the desired information and can accessed by computing component. Communication media may comprise computer readable instructions, data structures, program modules and/or other components. Further, communication media may include wired media such as a wired network or direct-wired connection, however no media of any such type herein includes transitory media. Combinations of the any of the above are also included within the scope of computer readable media.

In the present description, the terms component, module, device, etc. may refer to any type of logical or functional software elements, circuits, blocks and/or processes that may be implemented in a variety of ways. For example, the functions of various circuits and/or blocks can be combined with one another into any other number of modules. Each module may even be implemented as a software program stored on a tangible memory (e.g., random access memory, read only memory, CD-ROM memory, hard disk drive, etc.) to be read by a central processing unit to implement the functions of the innovations herein. Or, the modules can comprise programming instructions transmitted to a general-purpose computer or to processing/graphics hardware via a transmission carrier wave. Also, the modules can be implemented as hardware logic circuitry implementing the functions encompassed by the innovations herein. Finally, the modules can be implemented using special purpose instructions (SIMD instructions), field programmable logic arrays or any mix thereof which provides the desired level performance and cost.

As disclosed herein, features consistent with the disclosure may be implemented via computer-hardware, software, and/or firmware. For example, the systems and methods disclosed herein may be embodied in various forms including, for example, a data processor, such as a computer that also includes a database, digital electronic circuitry, firmware, software, or in combinations of them. Further, while some of the disclosed implementations describe specific hardware components, systems and methods consistent with the innovations herein may be implemented with any combination of hardware, software and/or firmware. Moreover, the above-noted features and other aspects and principles of the innovations herein may be implemented in various environments. Such environments and related applications may be specially constructed for performing the various routines, processes and/or operations according to the invention or they may include a general-purpose computer or computing platform selectively activated or reconfigured by code to provide the necessary functionality. The processes disclosed herein are not inherently related to any particular computer, network, architecture, environment, or other apparatus, and may be implemented by a suitable combination of hardware, software, and/or firmware. For example, various general-purpose machines may be used with programs written in accordance with teachings of the invention, or it may be more convenient to construct a specialized apparatus or system to perform the required methods and techniques.

Aspects of the method and system described herein, such as the logic, may also be implemented as functionality programmed into any of a variety of circuitry, including programmable logic devices ("PLDs"), such as field programmable gate arrays ("FPGAs"), programmable array logic ("PAL") devices, electrically programmable logic and memory devices and standard cell-based devices, as well as application specific integrated circuits. Some other possibilities for implementing aspects include: memory devices, microcontrollers with memory (such as EEPROM), embedded microprocessors, firmware, software, etc. Furthermore, aspects may be embodied in microprocessors having software-based circuit emulation, discrete logic (sequential and combinatorial), custom devices, fuzzy (neural) logic, quantum devices, and hybrids of any of the above device types. The underlying device technologies may be provided in a variety of component types, e.g., metal-oxide semiconductor field-effect transistor ("MOSFET") technologies like complementary metal-oxide semiconductor ("CMOS"), bipolar technologies like emitter-coupled logic ("ECL"), polymer technologies (e.g., silicon-conjugated polymer and metal-conjugated polymer-metal structures), mixed analog and digital, and so on.

It should also be noted that the various logic and/or functions disclosed herein may be enabled using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, non-volatile storage media in various forms (e.g., optical, magnetic or semiconductor storage media) though again does not include transitory media. Unless the context clearly requires otherwise, throughout the description, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

Although certain presently preferred implementations of the invention have been specifically described herein, it will be apparent to those skilled in the art to which the invention pertains that variations and modifications of the various implementations shown and described herein may be made without departing from the spirit and scope of the invention. Accordingly, it is intended that the invention be limited only to the extent required by the applicable rules of law.

While the foregoing has been with reference to a particular embodiment of the disclosure, it will be appreciated by those skilled in the art that changes in this embodiment may be made without departing from the principles and spirit of the disclosure, the scope of which is defined by the appended claims.

What is claimed is:

1. A machine, comprising:
  a tank configured to contain a volume of a coating material;
  a head portion having a plurality of product flight carriers configured to move a plurality of pieces of food products through the tank to coat an outer surface of each food product with the coating material;
  a product flight rail on to which each product flight carrier rests, wherein each of the plurality of product flight carriers are movable through the tank via a chain disposed within a chain track, and wherein each product flight carrier comprises a set of carrier dogs providing a removable connection of each product flight carrier to the chain; and
  a stripper plate located in the tank that causes the plurality of pieces of food products to tumble and roll over the stripper plate as the product flight carriers push the pieces of food products to remove any excess coating material from the outer surface of each food product.

2. The machine of claim 1, wherein each product flight carrier is adjustable and moves through the tank within variable distances of a bottom of the tank.

3. The machine of claim 1, further comprising:
  a heater connected to any of the tank or the head portion to heat the coating material to a predetermined temperature, wherein the tank is insulated to maintain the coating material at the predetermined temperature.

4. The machine of claim 1, wherein each product flight carrier further comprises a base portion and a plurality of pins that extend down from the base portion, the plurality of pins moving each of the food product pieces through the tank.

5. The machine of claim 4, wherein each pin in the plurality of pins is spaced apart from the other pins to ensure that any food product piece is not left in the tank.

6. The machine of claim 5, wherein the spacing of the plurality of pins is adjustable depending on a size of each food product piece being coated.

7. The machine of claim 5, wherein each pin is coated with a non-stick material.

8. The machine of claim 1, wherein each product flight carrier is moved through the tank outside of a product zone including a region of the tank not including the coating material by a chain track along the product flight rail, wherein the stripper plate is configured to discharge each food product piece from the tank based on an interaction between a first carrier dog and a corresponding striker plate.

9. The machine of claim 1, wherein the head portion is removable from the tank for cleaning.

10. The machine of claim 1, further comprising:
a plurality of interchangeable modules, wherein each module contains a different outer coating for the food product that may be applied to each food product.

11. The machine of claim 3, wherein the heater operates at a temperature less than 200 degrees Fahrenheit.

* * * * *